(12) United States Patent
Stein

(10) Patent No.: US 8,292,501 B1
(45) Date of Patent: Oct. 23, 2012

(54) TURBOPUMP WITH CAVITATION DETECTION

(75) Inventor: Elizabeth V Stein, Ft. Lauderdale, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 0 days.

(21) Appl. No.: 13/053,477

(22) Filed: Mar. 22, 2011

Related U.S. Application Data

(62) Division of application No. 12/120,116, filed on May 13, 2008, now abandoned.

(51) Int. Cl.
- *G01K 13/08* (2006.01)
- *G01K 1/02* (2006.01)
- *G01K 1/14* (2006.01)
- *G01N 25/00* (2006.01)

(52) U.S. Cl. ........... 374/153; 374/141; 374/121; 374/16

(58) Field of Classification Search .................. 415/185, 415/902; 374/100, 120, 121, 130, 131, 4, 374/57, 141, 208, 16, 28, 27, 153, 45; 250/338.1; 356/43; 73/112.01
See application file for complete search history.

(56) References Cited

U.S. PATENT DOCUMENTS

| | | | | |
|---|---|---|---|---|
| 3,623,368 A | * | 11/1971 | Decker, Jr. | 4/125 |
| 4,659,288 A | * | 4/1987 | Clark et al. | 416/186 R |
| 5,421,652 A | * | 6/1995 | Kast et al. | 374/208 |
| 5,507,576 A | * | 4/1996 | Fally | 374/127 |
| 6,109,783 A | * | 8/2000 | Dobler et al. | 374/131 |
| 6,364,524 B1 | * | 4/2002 | Markham | 374/131 |
| 6,698,920 B1 | * | 3/2004 | Maylotte et al. | 374/130 |
| 2008/0101683 A1 | * | 5/2008 | Zombo et al. | 382/141 |
| 2008/0295604 A1 | * | 12/2008 | Hoyte et al. | 73/760 |
| 2011/0123321 A1 | * | 5/2011 | Kilkenny | 415/185 |

OTHER PUBLICATIONS

SU 892011B Soviet Union Patent Abstract, Ivanov V.G. Dec. 1983.*

* cited by examiner

*Primary Examiner* — Gail Verbitsky
(74) *Attorney, Agent, or Firm* — John Ryznic

(57) ABSTRACT

A cryogenic turbo-pump with an inducer and a system for detecting an onset of cavitation at the blade tips of the inducer. An IR imaging sensor is used to view the blade tips during operation of the turbo-pump for a temperature drop that indicates the onset of cavitation. The imaging sensor includes a means to vary the image capture rate to that the rotating blade tip will appear to be stationary in order to measure the blade tip temperature. A window is formed in the inducer housing in which the imaging sensor can view the blade tips during operation.

4 Claims, 3 Drawing Sheets

TURBOPUMP WITH CAVITATION DETECTION

CROSS-REFERENCE TO RELATED APPLICATIONS

This application is a DIVISIONAL of U.S. patent application Ser. No. 12/120,116 filed on May 13, 2008 and entitled INFRARED HEALTH MANAGEMENT SYSTEM FOR A TURBO-PUMP.

FEDERAL RESEARCH STATEMENT

None.

BACKGROUND OF THE INVENTION

1. Field of the Invention

The present invention relates generally to cryogenic liquid turbo-pumps, and more specifically to detecting cavitation within cryogenic liquid turbo-pumps.

2. Description of the Related Art including information disclosed under 37 CFR 1.97 and 1.98

The success of a rocket launch depends upon the reliability of the launch vehicle, with the riskiest part of the vehicle being the rocket engine. For launch vehicles fueled by a pump fed liquid propellants, the highest risk component is the engine's turbo-machinery. The turbo-pump assembly (TPA) accounted for 32% of the launch failures from the 1,442 US launches during the years 1965 to 2004. Moreover, of the 4,400 launches worldwide, 37% of the engine failures were due to the turbo-pump assembly.

The top two life issues for turbo-pumps are the turbine blades and the bearings. The third most common failure in turbo-pumps is due to cavitation. The original Rocketdyne turbo-pumps on the Space Shuttle Main Engine (SSME) had to be replaced every one to three missions due to insufficient life in either the turbine blades or the bearings. Their design life goal was for 55 missions.

Currently in turbo-pumps, there is no direct measurement of turbine blade health. In the gas turbine industry, a gas path analysis is typically done, with information on the expected performance of the turbine coming from either a component map (which is input to the generalized cycle program) or a component level model (part of a cycle deck specific to the engine type). The actual component performance is determined by comparing the measurements, such as exhaust temperature, with their expected values by calculating error terms. The solver iterates on these error terms to some tolerance, thus computing the actual component performance. The actual measurements and actual performance can then be compared to a historical database and/or further processed by specific algorithms to determine the turbine's health.

Similarly, the existing methods for rolling element bearing health monitoring rely on indirect measurements, such as accelerometers and acoustic emission probes for vibratory data, and thermocouples on the bearing outer ring. These measurements try to capture the most typical rolling element bearing failure modes: contact fatigue and skidding damage. These failures increase heat generation due to friction resulting from the fault. However, 90% of the heat generation occurs on the bearing inner raceway, so the outer ring thermocouple is often the last indicator of a fault. Additionally, for accelerometers and acoustic emission probes to detect a fault, the vibration signal has to be strong enough to pass through the bearing dead band clearance. Also, thus far, due to their sensitivity, acoustic emission probes have not been actively used for in-flight health management decisions. These are all limitations of the present technology.

One of the main limiting factors in the performance of a pump is due to cavitation. Cavitation is the phenomenon where the local pressure of a liquid drops below the vapor pressure at the given temperature, causing a vapor bubble to form. This happens in pumps in regions where the flow is accelerated so quickly that the local static pressure drops below vapor pressure. Cavitation usually occurs just downstream of the pump inlet, before the pressure has risen sufficiently high enough above vapor pressure. In a turbo-pump, the onset of cavitation typically occurs on the inducer blade tips, in the blade tip vortices.

Cavitation causes a break down in the suction performance of a pump, and can also be highly damaging to the pump blades. When the bubbles are swept along to regions of higher pressure, the metal surface near where the bubbles collapse will experience erosion. Lastly, cavitation affects the flow field through a pump and can cause unsteadiness. This unsteadiness can manifest itself in a manner similar to rotating stall in a compressor or to a compressor surge.

Raising the inlet pump pressure increases the margin against cavitation. This margin is called net positive suction head, or NPSH. However, there exists many applications where the inlet pressure cannot be raised, such as in a rocket engine turbo-pump. The lower the tank pressure is, the less structural reinforcement is needed for the propellant tank, and hence decreasing the weight of the flight vehicle. Most turbo-pumps employ advanced inducer designs in order to avoid cavitation in the main pump. Additionally, depending on if the propellant is cryogenic, thermodynamic suppression head (TSH) effects may have to be taken into account. The TSH effects cause a local temperature drop in the fluid which acts to suppress cavitation because the temperature drop also reduces the vapor pressure. TSH effects vary depending on the fluid. For liquid hydrogen, it is often a considerable benefit, adding up to 100+ ft of NPSH margin. In liquid oxygen, the benefit is less significant.

At this time, there is not a reliable way to predict the inception of cavitation. What is currently done to test a design for its resistance to cavitation is to incrementally drop the inlet pressure while the pump head rise is measured. The collapse of the bubbles is very noisy and hence once caviation has began, it can be picked up by acoustic probes. As shown in FIG. 1, the primary amount of blade damage would occur well before the measured performance breakdown of the pump. The Thoma cavitation number shown on the x-axis is simply a measure of the difference between the inlet and vapor pressures, divided by the total pressure rise.

U.S. Pat. No. 7,231,817 B2 issued to Smed et al. on Jun. 19, 2007 and entitled INSPECTION SYSTEM FOR A TURBINE BLADE REGION OF A TURBINE ENGINE discloses an IR camera used to image hot sections of the turbine blades to determine the engine health. The inspection system includes a viewing tube that extends through the engine casing to a location in which the IR viewing will take place, in this case at a location pointing right at the turbine blades. The system also includes one or more lens and an optical lens within the tube, and a cap on the blade end with an aperture adjacent to the cap to allow light to pass through. The Smed U.S. Pat. No. 7,231,817 B2 is incorporated herein by reference.

BRIEF SUMMARY OF THE INVENTION

The present invention is a process for detecting the beginning of cavitations on the blade tips of an inducer using an infrared (IR) optical sensor camera that can measure the temperature drop that would occur in cryogenic liquids with TSH effects, before the onset of cavitation. This infrared optical sensor can be added to a test rig that already has a window to view the cavitation. The infrared optical sensor is capable of operating in temperatures at minus 400 degrees F., and has a resolution in the range of 1 to 2 degrees C. The IR optical sensor measures the blade tip surface temperature looking through a liquid medium, since the best place to look for a temperature drop due to TSH would be near the blade tips because cavitation typically first occurs in the blade tip vortices.

The IR imaging system and process of the present invention can be used in a pump or a hydraulic turbine in which a blade reacts with a flowing liquid in which cavitation can occur. A tip of a blade is imaged by the IR camera to detect for a change in temperature of the blade tip that would indicate an onset of cavitation.

The third most common failure mode in a turbo-pump is cavitation. The IR optical sensor can be used as part of as tip timing system to detect when an inducer blade has become unevenly loaded due to cavitation.

In another embodiment of the present invention, a process for detecting the temperature of an inner raceway in a bearing used in the cryogenic turbo-pump is disclosed which uses the same IR optical sensor or camera to view the inner raceway. The IR optical sensor can also be used to monitor the rolling element bearing inner raceway temperatures by relieving the shoulder of the outer raceway of the bearing and angling the camera to a point at the bearing inner raceway surface where the ball loading occurs. Similarly, the existing methods for rolling element bearing health monitoring rely on indirect measurements such as accelerometers and acoustic emission probes for vibratory data and thermocouples on the bearing outer ring. These measurements try to capture the most typical rolling element bearing failure modes: contact fatigue and skidding damage. These failures increase heat generation due to friction resulting from the fault. However, 90% of the heat generation occurs on the bearing inner raceway, so the outer ring thermocouple is often the last indicator of a fault. Additionally, for accelerometers and acoustic emission probes to detect a fault, the vibration signal has to be strong enough to pass through the bearing dead band clearance. Also, thus far, due to their sensitivity, acoustic emission probes have not been actively used for in-flight health management decisions. These are all limitations of the present technology.

As soon as a micro-crack forms on a turbine blade or a bearing raceway, there is an increase in heat generation due to the rubbing of the crack surface. This increased heat generation is the first detectable sign of a fault. The health management system of the present invention overcomes the above described limitations by being able to detect this first indicator of a turbine blade or bearing rolling element fault. The process of the present invention is also used to monitor the rolling element bearing inner raceway temperature by relieving the shoulder of the bearing and angling the IR camera to a point at the bearing inner race.

DETAILED DESCRIPTION OF THE INVENTION

Figure 1:
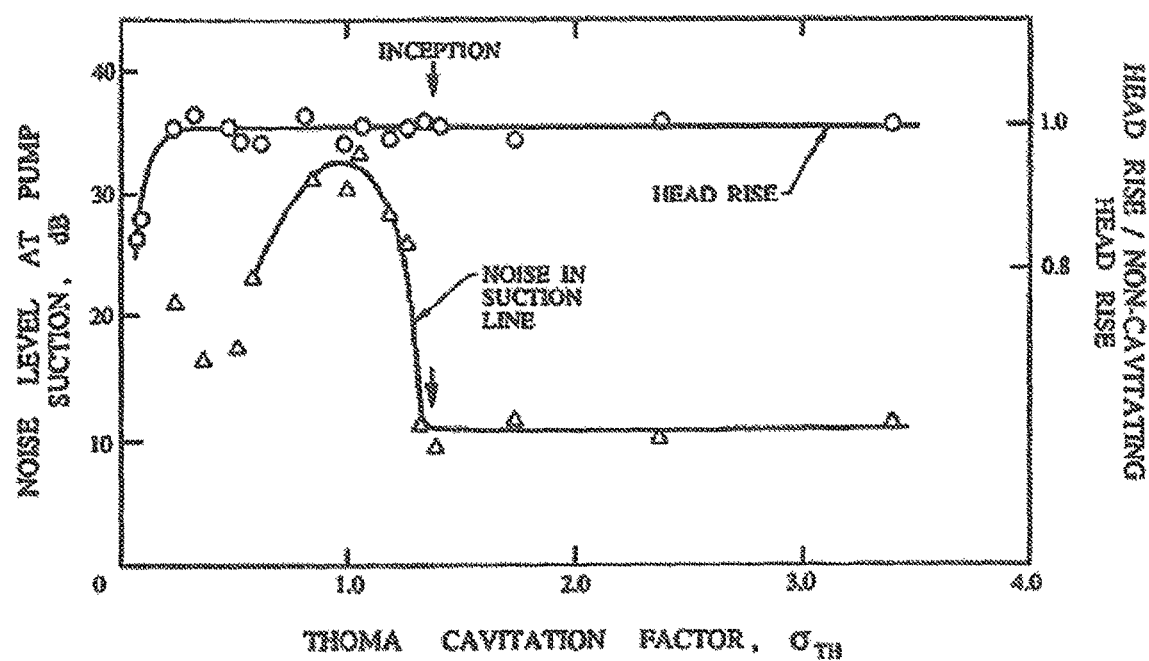
FIG. 1 shown a chart of the break down in pump performance, and measure of noise versus cavitation number.
Figure 2:
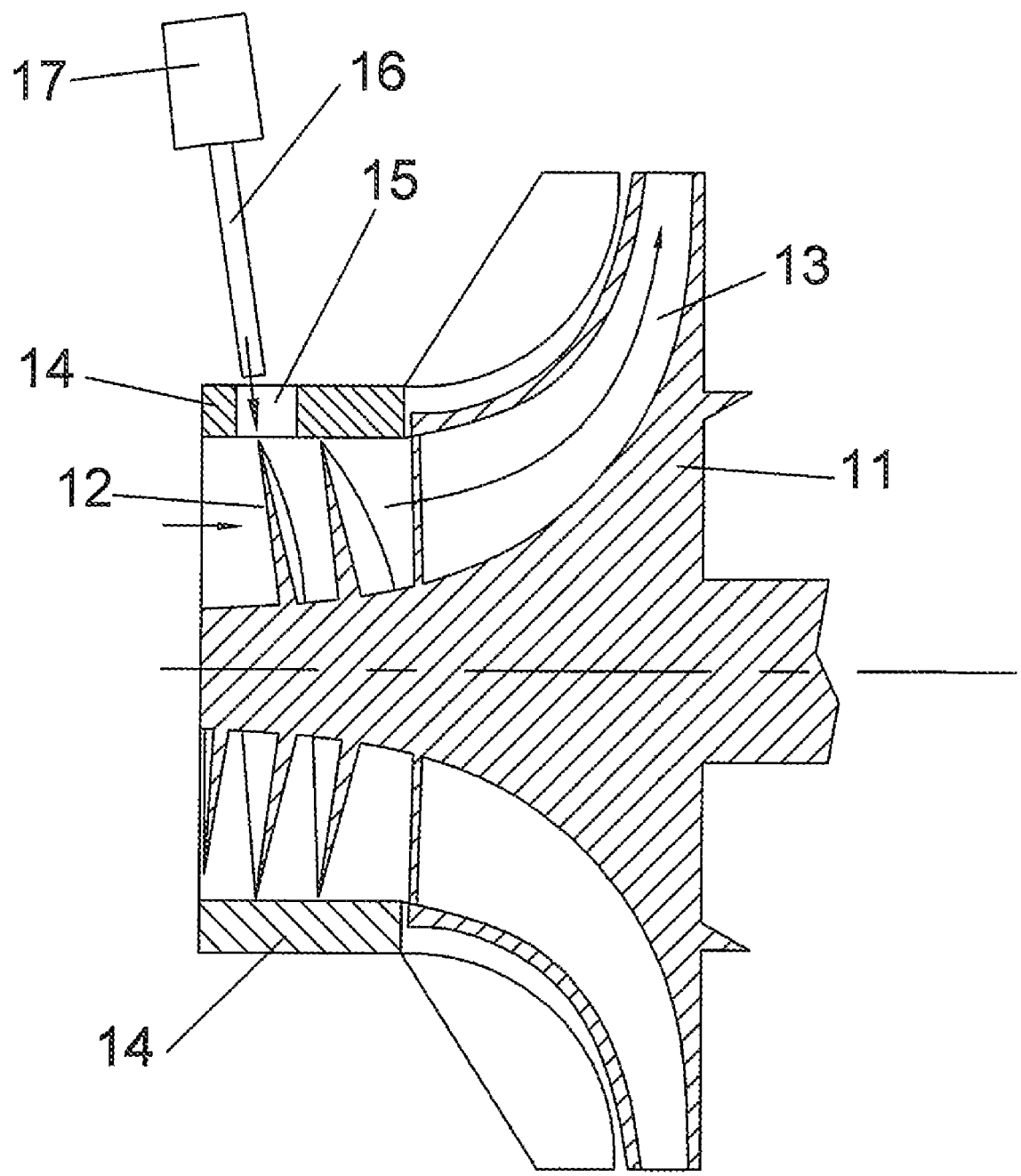
FIG. 2 shows a turbo-pump with the IR sensor of the present invention.

The first embodiment of the present invention is a cryogenic turbo-pump with an IR optical sensor camera used for health monitoring of the turbo-pump in order to detect when cavitation at the inducer is about to begin. FIG. 2 shows a prior art cryogenic turbo-pump used in a rocket engine to pump Hydrogen to the combustor chamber. The turbo-pump includes a rotor shaft 11 that supports an axial inducer 12 on the inlet let and a centrifugal pump 13 immediately downstream from the inducer 12 in the fluid flow direction. The inducer 12 is a relatively low pressure pump and the centrifugal pump 13 is a relatively high pressure pump.

The inducer 12 includes a spiral arrangement of blades with blade tips on the outer ends. A turbo-pump casing 14 forms a flow path for the fluid being pumped and includes an optically clear window 15 positioned to view the blade tips of the inducer. The window is positioned to view the blade tip at the largest radius and most forward location of the blade tip. This is where the cavitation would begin in the inducer. For a cryogenic material such as liquid Hydrogen, the optically clear material can be Yttrium or sapphire glass. An infrared (IR) optical sensing camera 17 (such as the one used in the Smed et al U.S. Pat. No. 7,231,817 B2) with a viewing tube 16 (if necessary) is used to view the blade tips through the window 15 for detecting if cavitation is about to begin. Since cavitation in the cryogenic turbo-pump will begin at the inducer blade tips, setting up the camera 17 to view this position is necessary.

The IR camera is set to detect the temperature at the blade tips in the range of minus 400 degrees F. with resolution of around 1 to 2 degrees C. When cavitation at the blade tips is about to begin, a temperature drop on the blade tips due to TSH would occur. When the IR camera detects this temperature drop, it will provide a visual indication of cavitation in the cryogenic inducer is about to begin. The IR imaging sensor takes pictures as the blade tips pass by. The frequency of the picture taking is adjusted until the blade tips appear to be motionless in order to view the tip temperature. The IR imaging sensor can take the picture of one certain blade tip as it rotates past the camera, or the camera can take pictures of different blade tips as they pass by. As long as the images of the blade tips appear to be still, the camera can be used to detect the temperature change required to determine the onset of cavitations. If required, a strobe light can be synched with the IR imaging sensor to illuminate the images. An operator can view the IR imaging sensor and see when a noticeable temperature drop occurs that indicates an onset of cavitation. Or, the IR imaging sensor can be connected to a processor such that the temperature drop can be detected automatically by the processor and indicate this in the data or activate an alarm.

In order to view the blade tips of the inducer as the turbo-pump is operating, the IR camera must take snap shots of the specific blade tip location as the blade tip rotates. The camera will therefore "blink" in sync with the rotation of the blade tip that is being viewed. In operation, the camera will appear to be viewing a non-moving image. However, because of the synchronized snap shots of the blade tip position, the image will really be viewing the rotating blade tips.

The inducer blade tip IR imaging sensor can be used on a test rig in which the turbo-pump is tested for cavitation in the inducer. Or, the IR imaging sensor can be used on the actual rocket engine that uses the turbo-pump to monitor for cavitation during the actual operation of the rocket engine. In the test rig or the actual engine, a window must be includes for the IR imaging sensor to be able to "see" the blade tips.

The IR imaging system and process of the present invention can be used in a pump or a hydraulic turbine in which a blade reacts with a flowing liquid in which cavitation can occur. A tip of a blade is imaged by the IR camera to detect for a change in temperature of the blade tip that would indicate an onset of cavitation. One of the blades can be singled out for imaging, or a different blade can be imaged as the plurality of blades rotate within the housing.

Figure 3:
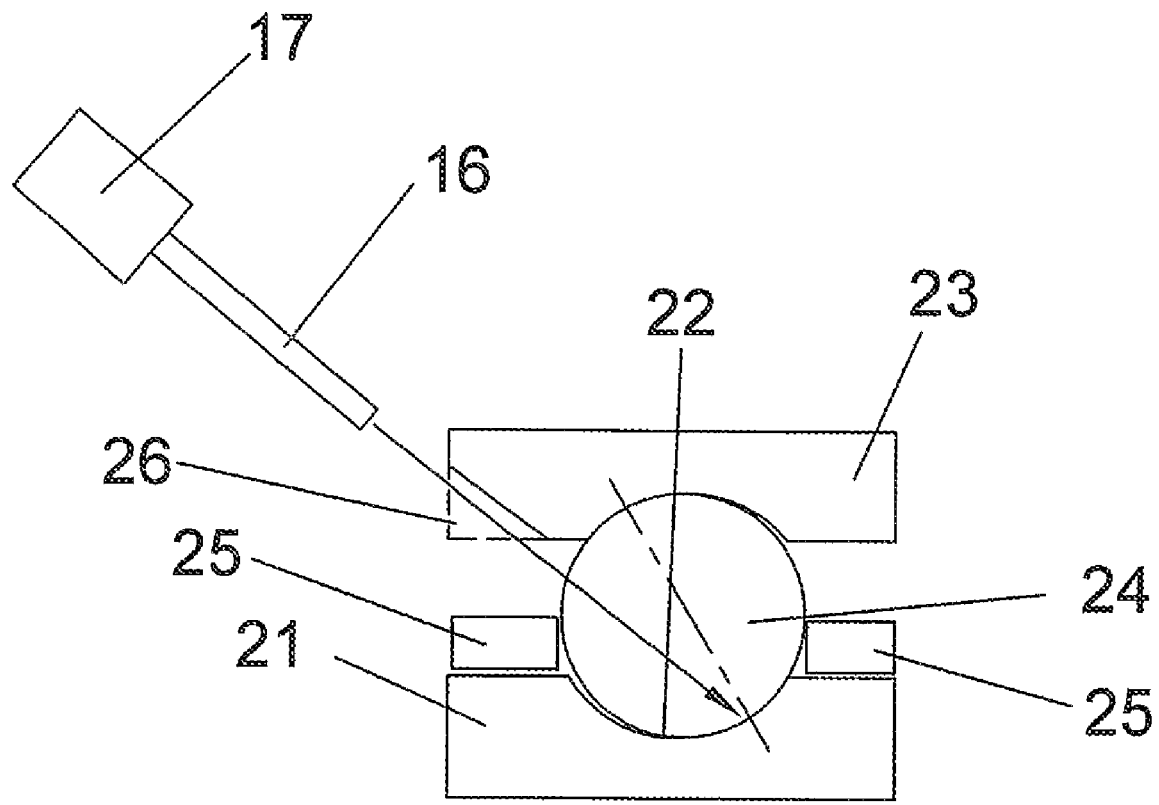
FIG. 3 shows a bearing with an inner raceway and the IR sensor to monitor the raceway temperature of the present invention.

In the embodiment of FIG. 3, the IR camera is used to detect a temperature of an inner raceway of a rolling element, such as a roller or a ball, used in a cryogenic turbo pump of the rocket engine. The rolling element is a ball bearing for this embodiment and includes an inner ring 21 and an outer ring 23 each with a raceway for the plurality of balls 24 to ride along. A cage 25 on both sides of the balls holds the balls within the raceways. The bearing is used to rotatably support a rotor shaft in the turbo-pump of the rocket engine that pumps either the fuel or the oxidizer to the combustion chamber. In the bearing of FIG. 3, the balls are loaded against the bottom ride side of the raceway in the inner ring 21 and against the upper left side of the raceway in the outer ring 23 to provide for a thrust bearing as well. The dashed angled line passes through the surfaces on which the balls are pressed against. Since the inner raceway 21 is where the majority of the heat generation occurs on the bearing, this is the location to monitor for bearing health to detect if and when failure will occur. During operation of the bearing, the rolling element will be forced outward against the outer raceway due to centrifugal forces. More load is placed against the outer raceway as less load is placed on the inner raceway. At a certain speed, enough of the load on the inner raceway is removed so that the rolling elements will start to slide against the inner raceway instead of roll. This sliding of the rolling elements against the inner raceway is what generates the excessive amounts of heat that causes the bearing to fail.

The IR camera 17 with the viewing tube 16 is positioned to video the inner raceway surface with high ball contact. In order to allow for the camera 17 to view this location, a relieved shoulder 26 is formed in the upper raceway on the side opposite to the inner raceway ball contact surface as seen by the dashed lines on the corner of the upper raceway. Thus, the camera 17 can view the surface on the inner raceway for temperature. In another embodiment, the relieved shoulder can be a hole passing through the outer raceway 23 that will allow for the imaging of the inner raceway surface. The IR camera 16 is like the camera disclosed in the Smed et al U.S. Pat. No. 7,231,817 B2 discussed above. This camera uses a strobe to capture an image of the inner raceway in-between the balls or rolling elements. The strobe is synced to the camera to take these fast images that represent motion. The strobe frequency is adjusted until the camera takes images in-between the balls so that the inner raceway surface can be seen and the temperature determined from the image. When the frequency of the imaging capture is correct, the motion of the rolling elements traveling around the inner raceway will appear to be frozen such that the inner raceway is viewable by the IR imaging sensor to detect the temperature.

The camera is able to see through the cryogenic material around the bearing raceway because of the use of far infrared imaging. Using increased sensitivity in the imaging of the camera will allow for a greater thermal resolution in order to detect small temperature variations in the inner raceway. The present invention also uses frequency excitations to see through the opaque liquids or gases such as RP-2 and RP-2/Lox combustion gases. The video images are stored in a local memory. A conversion of post-processing of thermal radiance to real-time is also performed.

The IR imaging sensor to view the temperature of an inner raceway in the bearing of the turbo-pump of the present invention can be used in a test rig in which the operation of the bearing is viewed, or in an actual engine during operation in which the probe on the camera can be inserted to a location within the bearing and turbo-pump in order to "view" the inner raceway.

I claim the following:

1. A turbo-pump comprising:
an inducer with a blade, the blade having a blade tip;
an inducer housing;
an optically clear window within the inducer housing positioned to view the blade tip as the blade tip rotates by the window;
an IR imaging sensor operatively positioned to view the blade tip through the window; and,
control means to control the imaging of the IR imaging sensor so that a temperature drop on the blade tip indicating an onset of cavitation can be detected.

2. The turbo-pump of claim 1, wherein:
the control means allows for the IR imaging sensor to view the same location on a blade tip as the inducer pumps liquid.

3. The turbo-pump of claim 1, wherein:
the turbo-pump is a test rig used to test a turbo-pump for cavitation.

4. The turbo-pump of claim 1, wherein:
the turbo-pump is a cryogenic turbo-pump used for a liquid rocket engine.

* * * * *